(12) United States Patent
Grobler (10) Patent No.: US 7,546,890 B2
(45) Date of Patent: Jun. 16, 2009

(54) MOTOR VEHICLE WITH AN ADDITIONAL CRAWLER UNDERCARRIAGE

(75) Inventor: Hendrik W. Grobler, Clyde Park, MT (US)

(73) Assignee: Hendrik Grobler, Clyde Park, MT (US)

( * ) Notice: Subject to any disclaimer, the term of this patent is extended or adjusted under 35 U.S.C. 154(b) by 483 days.

(21) Appl. No.: 11/385,971

(22) Filed: Mar. 21, 2006

(65) Prior Publication Data
US 2006/0254833 A1    Nov. 16, 2006

(30) Foreign Application Priority Data
Mar. 22, 2005   (DE) .................. 10 2005 013 692

(51) Int. Cl.
   *B62D 55/04*   (2006.01)
(52) U.S. Cl. ............. 180/9.21; 180/9.28; 180/9.3; 180/9.34; 180/9.36; 180/9.38
(58) Field of Classification Search ........... 180/9.21, 180/9.28, 9.3, 9.34, 9.36, 9.38
   See application file for complete search history.

(56) References Cited

U.S. PATENT DOCUMENTS

| | | | | |
|---|---|---|---|---|
| 2,287,290 | A * | 6/1942 | Brown ............ | 180/9.28 |
| 4,204,583 | A * | 5/1980 | Toyoura et al. ....... | 180/9.28 |
| 5,287,938 | A * | 2/1994 | Welling ............ | 180/9.3 |

FOREIGN PATENT DOCUMENTS

| | | |
|---|---|---|
| DE | OS-2026 295 | 12/1971 |
| DE | OS-2735389 | 2/1978 |
| DE | OS 27 53 706 | 6/1979 |
| DE | OS-28 11 675 | 9/1979 |
| DE | 38 43 532 | 1/1990 |
| DE | 39 10 263 | 10/1990 |
| DE | 40 33 147 | 4/1992 |
| DE | 690 14 772 T2 | 4/1995 |
| DE | 195 19 670 | 10/1995 |

* cited by examiner

*Primary Examiner*—Paul N Dickson
*Assistant Examiner*—Michael R Stabley
(74) *Attorney, Agent, or Firm*—Norris McLaughlin & Marcus, PA; Christa Hildebrand, Esq.

(57) ABSTRACT

A motor vehicle with an additional crawler undercarriage includes assemblies to reduce the load pressure transferred to the ground and to improve off-road performance. The assemblies include components used in conventional mass-produced vehicles, with a chassis (1. 1), a body with optional cargo area (1.2), undercarriage, such as axles (1.3) with steered (1.4) and/or unsteered wheels (1.5), tires (1.6), wheel suspension, spring support, steering and brakes, and an engine-transmission unit (1.7) with drive components. An additional crawler undercarriage (2) can be mounted and/or retrofitted on the chassis (1.1) between the axles (1.3) and used for traction in any terrain. The additional crawler undercarriage (2) includes an undercarriage (2.1) with drive wheels (2.2) and carrying wheels (2.3) and revolving crawler chains/crawlers (2.4) and associated elements, first means (3) for providing an optionally extendable and retractable connection of the undercarriage (2.1) with the chassis (1.1), and second means (4) for selectively transmitting or coupling a second drive from the motor vehicle to the additional crawler undercarriage (2), as well as third means (5) for controlling the operation of the additional crawler undercarriage (2), such as steering, braking, acceleration and speed of the crawler chains/crawlers (2.4).

11 Claims, 5 Drawing Sheets

MOTOR VEHICLE WITH AN ADDITIONAL CRAWLER UNDERCARRIAGE

FIELD OF THE INVENTION

The invention is directed to a motor vehicle with an additional crawler undercarriage, wherein the additional crawler undercarriage is arranged between the axles and can be retracted and extended to improve the off-road performance of conventional motor vehicles. A drive for the additional crawler undercarriage can be operatively connected as needed and/or depending on a particular situation by using a system of interconnected components and functions of the motor vehicle.

BACKGROUND OF THE INVENTION

It is generally known to install in motor vehicles running on wheels additional crawler undercarriages between the steered axles and the unsteered axles to reduce the load pressure on the ground and/or to enhance off-road performance. In the context of the following description, the crawler undercarriage also includes crawler chains and crawlers, i.e., motor vehicles with additional undercarriages where the wheels for reducing the load pressure on the ground run on crawler chains. Such arrangements are particularly useful for off-road vehicles, construction vehicles, agriculture and forest management vehicles, and also for transport vehicles, mobile homes and in military vehicles.

In these vehicles, crawler undercarriages were installed to address different applications and solve different problems and to make wheeled vehicles suitable for off-road use. The switch-over to the crawler undercarriage and activation of the crawler undercarriage can be accomplished in many different ways, but still poses problems and needs improvement.

The invention disclosed in DE-OS 20 26 295 provides a crawler undercarriage of the aforedescribed type which makes it possible to quickly convert road vehicles to vehicles for off-road driving in snow and the like, without requiring substantial changes on the vehicle itself. After removal of the crawler undercarriage, the vehicle should again be usable as a road vehicle.

At the same time, the crawler undercarriages should be as wide as possible to improve off-road performance.

To solve this problem, a crawler undercarriage with a clutch was proposed that is applied to the driving wheel and at least partially supports the undercarriage. The clutch can be attached on the driven disk wheel of the vehicle instead of a wheel rim with the same mounting hardware. With a crawler undercarriage of this type, the rims of the driven wheels of the vehicle, for example of a passenger car, are removed and the clutch of the crawler undercarriage is screwed in place. The drive of the vehicle powers the driving wheel of the crawler vehicle via this clutch, with the entire vehicle now being driven via the crawler undercarriage.

Although this changeover to a tracked vehicle should be quick and not require changes on the vehicle, the vehicle must still be stopped and shut down, because the changeover is manual.

DE-OS 27 35 389 discloses a simpler concept of a wheeled vehicle with a crawler chain, which is only operated when the vehicle drives across impassable terrain.

A freely retractable crawler chain with a suitable power source is installed, wherein the crawler chain is installed on the vehicle frame approximately midway between the front wheels and the rear wheels. The crawler chain that is installed between the front wheels and the wheel wheels of the vehicle can rotate and be pulled up against the vehicle frame. The power source is independent of the driving wheels, when the crawler chain is raised and not in contact with the road surface. Conversely, the drive source is coupled to the driving wheels when the crawler chain is lowered and in contact with the road surface.

This arrangement obviates the need for a complex manual changeover and an interruption of the driving operation, but power transfer to and retraction of the crawler chain is still relatively complex.

DE-OS 28 11 675 proposes an additional crawler chain undercarriage for motor vehicles, which can be easily installed on the vehicle, in particular on off-road vehicles such as jeeps and the like, at a later date, or during manufacture. The additional drive is configured for bilateral use on both sides of the vehicle frame and can operate as an independently actuated lifting, supporting or vehicle stabilization element.

As also disclosed in DE-OS 28 11 675, each drive assembly of this type which is formed of a crawler chain, guide rollers, a roller yoke and a resiliently supported chain roller guide, is fixedly, but independently, connected with the respective side of the vehicle frame via an auxiliary frame forming a support structure. In one embodiment, the crawler chain is formed as a tensionable, flexible belt or as a link chain with a patterned surface. The guide rollers are identical or have different stepped roller diameters. The roller guides are mounted on the auxiliary frame by either hydraulic or mechanical elements, such as guide pins, guide bushings and spring elements, and are secured in their final position by rods and other standard, commercially available safety elements.

However, the hydraulic and mechanical actuators for the additional device are difficult to install and to manufacture due to their special design.

DE 38 43 532 A1 discloses additional crawler pairs that can be moved vertically underneath a chassis frame to improve traction. The purpose is here to provide an off-road vehicle and road vehicle that employs pairs of wheels or crawlers depending on the situation, whereby the undercarriage lacks a dedicated drive. This concept only applies to drawn/pulled transport vehicles although the actual drive concept is hereby unimportant.

DE 40 33 147 A1 discloses a multipurpose vehicle with additional crawler undercarriage for motor vehicles, wherein the additional crawler undercarriage includes an additional braking system, an additional integrated direction-reversing device, and an extension device to raise the actual vehicle from the ground.

Although the vehicle is intended for general use, this arrangement is complex to implement, because the additional crawler undercarriage requires a support structure with drive shafts, bearings and additional rollers, a pair of specially designed continuous crawlers, a steering connection installed in the center of the support structure, and so-called actuating devices which may include power transmission, reversing mechanism, pressure cylinders, valves and associated hydraulic controls.

It therefore appears beneficial to return to the original objective and to simplify the design of both the drive mechanism and the provisioning of additional crawler undercarriages.

For example, DE-OS 27 53 706 discloses as a potential solution a Rakett running gear. However, this approach does not optimize the drive mechanism.

DE 195 19 670 A1 suggests converting tracked vehicles into simple road vehicles, but the proposed solution is also complex.

The drive system disclosed in DE 39 10 263 A1 which employs a coupling element between rotating and linear movement for driving an additional running gear also requires specially manufactured components.

DE 690 14 772 T2 discloses a motor vehicle for road and off-road use, which can be used for surveying, exploration or drilling activities. The vehicle has an auxiliary frame with crawlers arranged between the wheels and includes individually actuatable lifting cylinders. The auxiliary frame can be lowered sufficiently to raise the wheels off the ground. The lifting cylinders can hold the vehicle in a desired horizontal position while resting on the crawlers. The auxiliary frame can optionally be mounted underneath an existing vehicle.

The approach disclosed in DE 690 14 772 T2 not only enhances the mobility with the crawlers, but also provides a level and stable support for the vehicle during certain specialized operations. Nor does this approach suggest to arrange additional extendable and retractable crawler undercarriages between the steered and unsteered wheel axles in a mass-produced motor vehicle by, for example, retrofitting the vehicle with an additional mechanically simple and low-cost crawler undercarriage, with a low installation height. DE 690 14 772 T2 also does not show a way how the additional crawler undercarriage can be retracted and extended without impairing the operation of the original motor vehicle, or how to efficiently drive the additional crawler undercarriage with the existing drive components of the motor vehicle, how to assemble the additional crawler undercarriage at low-cost from standardized production components, and how to power the additional crawler undercarriage efficiently and effectively from the motor vehicle.

It is therefore an object of the invention to provide a drive system for motor vehicles with extendable and retractable additional crawler undercarriages arranged between the steered and unsteered wheel axles, which obviates the disadvantages of the prior art and makes possible to retrofit a mass-produced motor vehicle with a simple and cost-effective additional crawler undercarriage, to retract and extend the additional crawler undercarriage without impairing the operation of the existing motor vehicle, to maintain the original ground clearance of the vehicle, to employ the existing drive elements of the vehicle for the additional crawler undercarriage, to assemble and procure the additional crawler undercarriage cost-effectively from standard components manufactured in series, and to transfer power from the motor vehicle to the additional crawler undercarriage with high-efficiency and economically.

SUMMARY OF THE INVENTION

According to one aspect of the invention, the running surface of the additional crawler undercarriage providing traction is mounted on the chassis with an electro-hydraulic system, which permits adjustment of the position and vertical spacing between the chassis and the crawler undercarriage. A transmission can be connected between the vehicle power source and the additional crawler undercarriage for selectively driving the additional crawler undercarriage. The drive power for driving the additional crawler undercarriage is derived from at least one driven wheel of the motor vehicle.

The additional crawler undercarriage can be driven by the drive system at any position and vertical spacing relative to the chassis. The drive system can be connected and disconnected depending on the required traction under the prevailing ground/terrain conditions The electro-hydraulic system, which extends and retracts the undercarriage and actuates or connects the undercarriage with the chassis, optionally also changes the length of the ground-contact surface of the crawler chains/ crawlers at the various spacings between the undercarriage and the chassis. A controller is integrated in the connectable drive system to control and/or adjust speed, power transfer, braking forces, travel directions and force transfer and/or specific traction performance for to the terrain.

The revolving crawler chains/ crawlers have a relatively short ground-contact length and include traction belts made of textile-rubber with chains elements and transverse webs, wherein the carrying wheels roll on the traction belts and on transverse webs.

The combination of the features exhibits surprising effects not found in conventional systems.

With the invention, an additional crawler undercarriage can be readily retrofitted, travel performance of the original vehicle on wheels is not affected when the additional crawler undercarriage is retracted and extended, the additional crawler undercarriage can be powered from the existing drive elements and has a small overall installation height when the additional crawler undercarriage is raised. This small installation height provides ample the ground clearance for the motor vehicle, so that the additional crawler undercarriage can be installed on the lower chassis behind an apron. Under extreme off-road travel or exceptional terrain conditions, the additional crawler undercarriage can also protect the undercarriage components of the motor vehicle. With the additional crawler undercarriage, the motor vehicle can be stored on blocks, without the wheels of the vehicle contacting the ground.

In one advantageous embodiment, the connectable drive system drives the additional crawler undercarriage using the output from at least one driven wheel of the motor vehicle. Power is transferred to the crawler chains/crawlers directly and with high-efficiency using simple components, such as flanged connections to brake drums or rims, as well as chain/pinion gears, belt/pulley gears or various toothed gears, all of which are readily available in production quantities.

In another advantageous embodiment, the connectable drive system can include a friction roller drive. The inventive friction roller drive includes at least one friction roller disposed on one wheel for transmitting the driving power to the additional crawler undercarriage as well as driving means, such as a reversing gear, which drives the driving wheel of the additional crawler undercarriage.

The friction roller drive engages by friction directly with the tire of the wheel, with the force supporting the motor vehicle generating the contact pressure. The force is produced when the wheel and the friction roller "ride" on the undercarriage of the revolving crawler chain/crawler. This effect was so far not suggested for generating a force and was therefore never considered in the rather complex operation of a motor vehicle with an additional crawler undercarriage.

As mentioned above, the connectable drive system can also be implemented by a flange mounted on at least one driven wheel which transfers power via an intermediate element, for example from a brake drum or a rim. The drive or brake power is thereby transmitted to the crawlers chains/crawlers with high-efficiency. Advantageously, the flanged output can be implemented by pinions with a chain, a pulley with a belt, or a toothed gear. Intermediate elements arranged on a tube encompassing the existing axle can then form a transmission path, from the wheels to the driving wheels of the additional crawler undercarriage, in the form of a connectable drive system with universal joint shafts/cardan shafts, a coupling and brake, using conventional components.

In yet another advantageous embodiment, the connectable drive system can be implemented as a transmission path, starting from a gear of the motor vehicle, for example the engine/transmission unit, or from the axle differential, and extending to the driving wheels of the additional crawler undercarriage with integrated cardan shaft/universal joint shaft, clutches and brakes, also using conventional components.

The connectable drive system can advantageously also be designed as a hydraulic transmission path, including hydraulic components, such as pump, converter and/or motor, and powered by existing drive components.

Drive systems using a combination of mechanical and hydraulic gear units, can also be employed depending on availability and/or operational functionality.

According to the inventive concept, all gear elements or couplings in the respective transmission path to the crawler chains/crawlers should prevent an adverse coupled motion between the elements of the connectable drive system.

The brake elements provided in the transmission path can be designed to separately control on the left and right side of the vehicle by driving the left and right crawler chains/crawlers at different speeds, in particular to change direction.

The friction roller can advantageously introduce supporting forces to the chassis/frame of the motor vehicle or of the output/drive by locking the additional crawler undercarriage in certain situations and positions to the rear axle and/or to set the axle itself to a fixed position. However, according to the invention, all connectable drive systems should be able to equalize axle movements and positions of the additional crawler undercarriage.

According to yet another advantageous embodiment, a relatively short, ground-contact length of the running surface of the revolving crawler chains/crawlers and their wrap-around length matches the steering forces and mechanisms in the original motor vehicle. This reduces the terrain-dependent steering and/or turning resistance during changes in the travel direction and compensates for the resistance by using power available from the motor vehicle.

A practical ground-contact length, for example for a pickup truck, is in the range of (only) 600 to 1000 mm.

The ground-contact length of the running surface of the revolving crawler chain/crawler can be further shortened by arranging hinged elements inside the base body or inside the additional crawler undercarriage. The hinged elements can be useful for extending active supporting rollers or supporting rollers that should be exposed to the load first. The traction is then at times oriented more transversely to the chain crawler/crawler, with regions of the running surfaces of the other crawler chains/crawlers temporarily losing ground contact or forming a clearance angle relative to ground.

In one advantageous embodiment, a compact electro-hydraulic system is used, which provides a substantial ground clearance for the motor vehicle when traveling exclusively on wheels. In an alternative system, the additional crawler undercarriage can be connected with the chassis with lockable articulated joints, with elements on sliders replacing the idler rollers (similar to a motorized sled), to make the design lightweight and better distribute the weight.

Advantageously, several pairs of consecutive, closely-spaced crawler chains/crawlers can be arranged between the axles.

The undercarriages and/or crawler chains/crawlers can be preassembled and include traction belts, chain elements and transverse webs, can be in form of a textile-rubber belt or link chain, and can have carrying wheels that roll on both the traction belts and the transverse webs.

Those skilled in the art will appreciate that linearly displaceable machine elements can be used instead of rotating elements and vice versa to implement the kinematic functions of mechanical, hydraulic or electrical components.

The inventive system also includes a program executable on a controller for controlling the operation of the additional crawler undercarriage. The program can execute the following steps:

(a) receiving and processing data about the condition of the terrain and data of the forces exerted on the motor vehicle, such as lateral traction/steering forces, (b) transmitting signals to the control elements that automatically, mechanically or manually cause the system 1. to deploy or not to deploy certain components, such as the additional crawler undercarriage, 2. to adjust and distribute forces to optimize traction transfer, for example, by increasing/decreasing wheel and/or load pressure to ground, 3. to optimize the differential speed or to brake the crawler chains/crawlers, 4. to apply with the crawler chains/crawlers additional lateral traction/steering forces, also depending on the steering angle of the steered wheels, for increasing the steering precision, 5. to increase road adherence by employing integrated traction aids, to improve nonskid behavior under wet road conditions, ice and snow, through application of lugs, spikes, and the like, 6. to energize tilting, lifting and tensioning devices, and control systems, 7. to control, optimized for safety, the interaction between extension of the additional crawler undercarriage and its ground-contact and initiate driving and braking forces, 8. to adjust the ground-contact length of the crawler chains/crawlers for optimizing the driving stability and the steering resistance, and/or 9. to operate the crawler chains/crawlers at speeds different from the speed of the wheels.

The program with the corresponding program steps and functions can be easily visualized and operated by the driver of the vehicle, for example, via a touch-in-display on the instrument panel mounted in the cabin and displaying the program steps.

Exemplary embodiments of the basic features of the invention will now be described with reference to the drawings.

DETAILED DESCRIPTION

Figure 1:
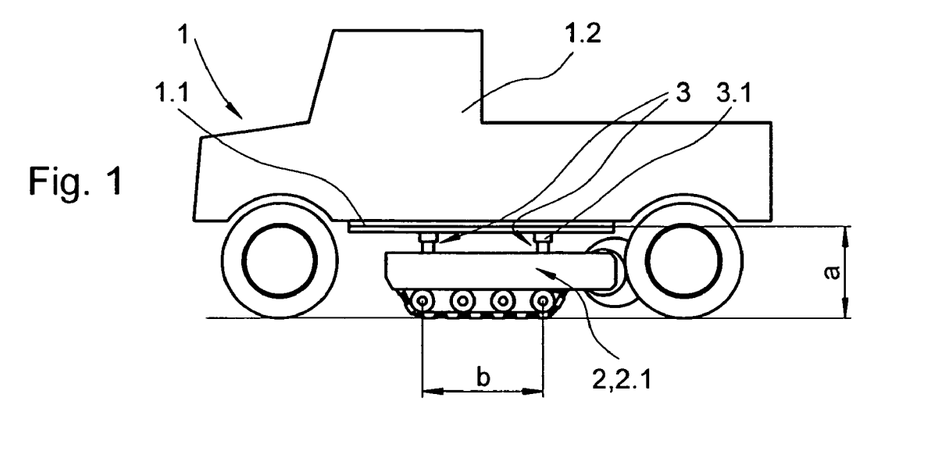
FIG. 1 is a side view of a motor vehicle with the additional crawler undercarriage contacting the ground, employing a drive according to the invention.
Figure 2:
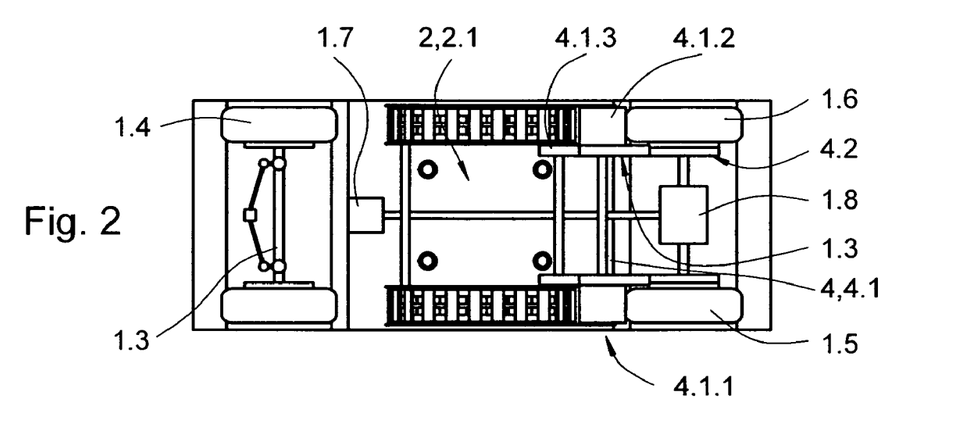
FIG. 2 is a view of the motor vehicle according to FIG. 1 from below, with the additional crawler undercarriage and the drive according to the invention implemented as a friction roller drive, and in an alternative embodiment shown as a flanged output.
Figure 3:
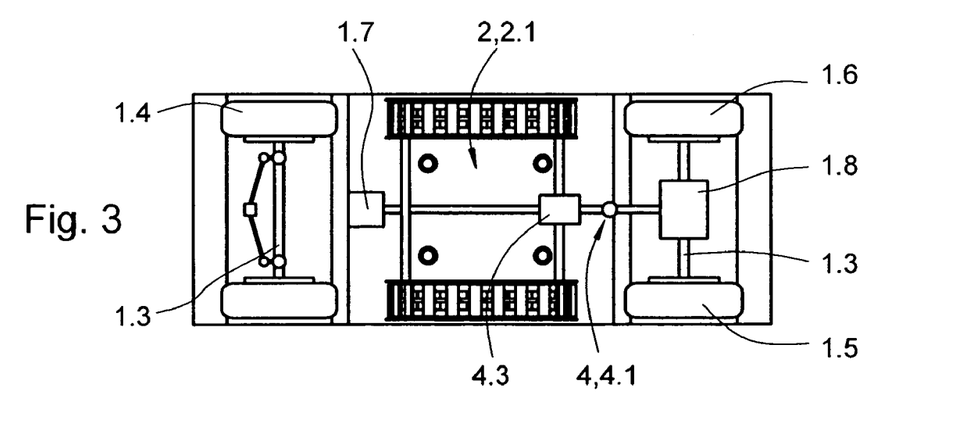
FIG. 3 is a view of the motor vehicle according to FIG. 1 from below with the additional crawler undercarriage and the drive according to the invention implemented, with a transmission path starting at the axle differential.

FIG. 1 shows in a side view a motor vehicle 1, such as a pickup truck, with a chassis 1.1, a body 1.2, and a cargo area. Arranged between the axles 1.3 shown in FIGS. 2 and 3 are an extendable and retractable additional crawler undercarriage 2 with an undercarriage 2.1, driving wheels 2.2, carrying wheels 2.3 and a revolving tracking chain/crawler 2.4, as shown in more detail in FIG. 6. First connecting means 3, for example an electro-hydraulic system 3.1, connects the additional crawler undercarriage 2 to the chassis 1.1 for extension and retraction, indicated here as having four-point attachment locations. Other mechanical connections, such as articulated joints, can also be used instead of the system 3.1.

FIGS. 1 and 2 also show the undercarriage, such as axles 1.3 with steered 1.4 and unsteered/driven wheels 1.5, tires 1.6 and an engine/transmission unit 1.7. Conventional components, such as wheel suspension, spring system, steering and brakes, are not shown.

FIGS. 1 and 2 show second drive means 4 according to the invention, such as an optionally connectable drive system 4.1, shown here as a friction roller drive 4.1.1, which is powered from the tire 1.6, with friction roller 4.1.2, as well as additional drive means, such as a reversing gear 4.1.3, which is implemented in an alternative embodiment shown in FIG. 2 as an intermediate element connected to a flanged output 4.2 from the driven wheels 1.5. FIG. 3 indicates a hydraulic transmission path 4.3 originating at the gear 1.8, such as a differential. The transmission path 4.3 can also be branched off from the engine and transmission unit 1.7.

FIG. 1 also shows that the traction-effective running surface b, or ground-contact surface, of the additional crawler undercarriage 2 is maintained by the first connecting means 3 in an adjustable position and vertical spacing relative to the chassis 1.1. In addition, as shown in FIGS. 2 and 3, the second drive means 4 includes a connectable drive system 4.1 for the additional crawler undercarriage 2. Although the specific mechanical arrangement is not shown, the additional crawler undercarriage 2 is thus driven by the connectable and disconnectable drive system 4.1 within an arbitrary range of the vertical spacing a and in an arbitrary position relative to the chassis 1.1. In addition, the first connecting means 3 of the additional crawler undercarriage 2, which connects the undercarriage 2.1 to the chassis 1.1 and controllably extends and retracts the undercarriage 2.1, is constructed so that the traction-effective, optionally adjustable length of the running surface b of the crawler chains/crawlers 2.4 can be effective at any distance a.

Figure 9:
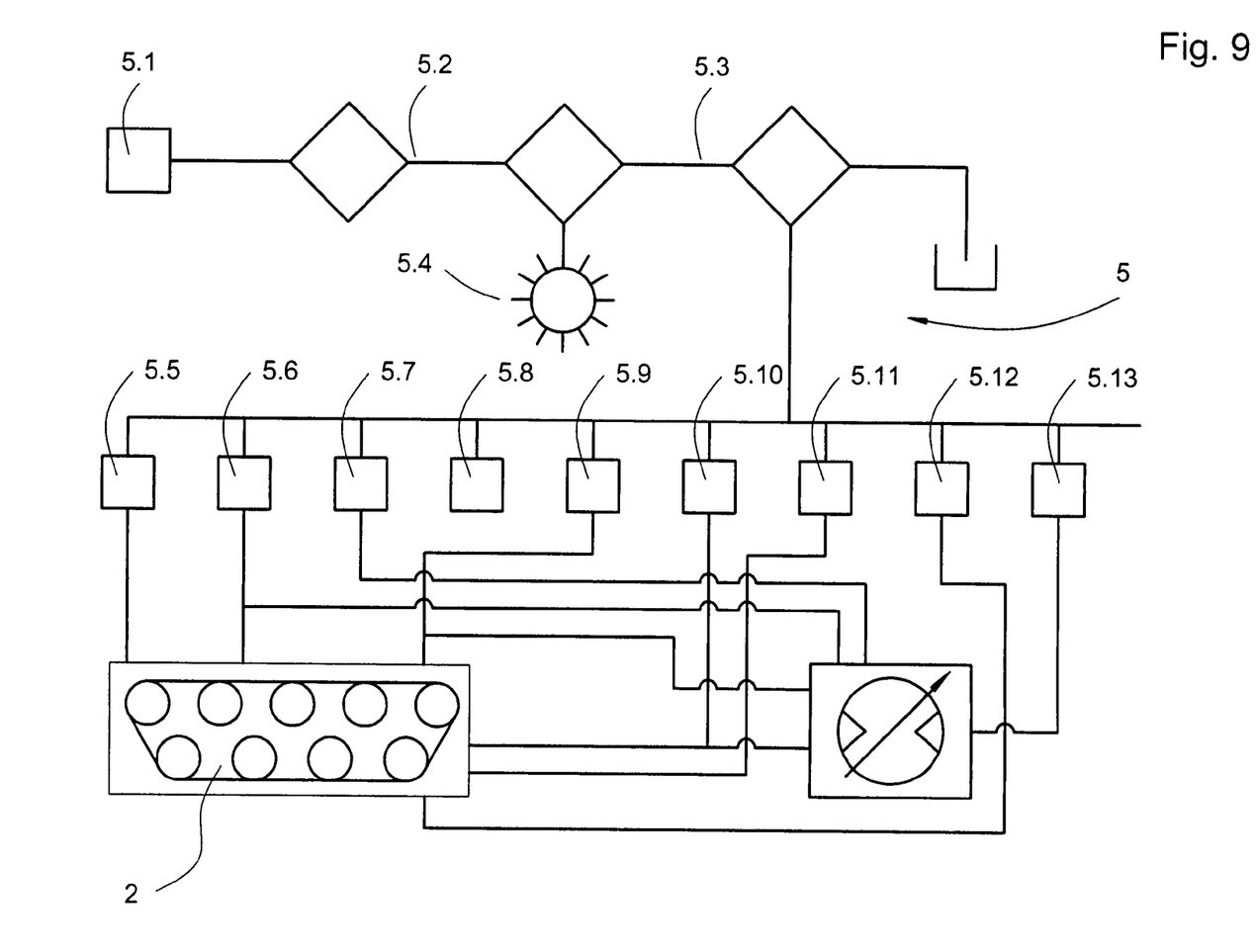
FIG. 9 is a schematic diagram of a program for a controller operating the motor vehicle with additional crawler undercarriage.

FIG. 9 shows third means 5, such as a control unit or controller, which can be integrated in the connectable drive system 4. 1, for controlling speed, power, braking forces, travel direction, as well as the force transferred to the terrain and/or other traction criteria. Implementation of a program for the controlling the operation of the system will be described below.

The length of the running surface b can be adjusted on the additional carriage using arrangements known in the art, such as mechanisms that change the wheelbase between the driving wheels 2.2 and the front carrying wheels 2.3 and apply tension to the revolving crawler chains/crawlers 2.4 to compensate for the change in their length.

Figure 4:
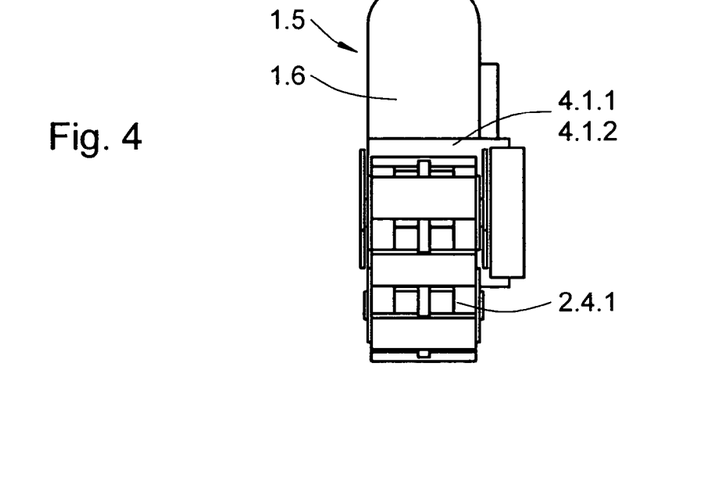
FIG. 4 is a partial view of the motor vehicle of FIG. 1 from the front of the additional crawler undercarriage onto a wheel of a rear axle of the motor vehicle, implemented as a friction roller drive.
Figure 5:
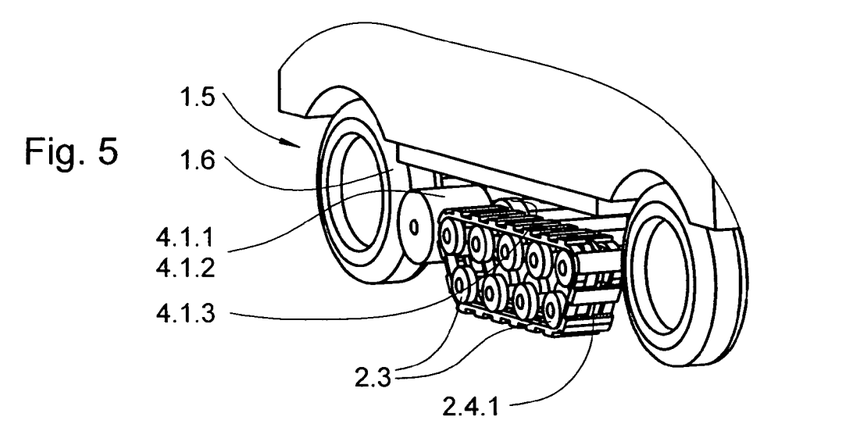
FIG. 5 is a perspective partial view onto a side of the motor vehicle according to FIG. 4.

As indicated in FIG. 4 and more clearly shown in FIG. 5, the friction roller drive 4.1.1 is arranged for force transmission directly on the tire 1.6 of wheels 1.5. The contact pressure is generated by the forces that support the additional crawler undercarriage 2 on the motor vehicle 1, and is used in addition to transmit the supporting forces to the motor vehicle. The force can be the result of a "roll-on" effect between, on one hand, the wheels 1.5 and the friction roller 1.2 and, on the other hand, the undercarriage 2.1 of the revolving crawler chains/crawlers 2.4, and can also be achieved using conventional components.

FIG. 2 shows an alternative embodiment where the connectable drive system 4.1 can be implemented as a flange disposed on at least one driven wheel 1.5 and transferring power via the intermediate element 4.2 from other elements (not shown), such as a brake drum, wheel flange or a wheel rim. The drive and brake energy can thus be effectively transmitted to the crawler chains/crawler 2.4. The flanged output can be implemented using conventional pinion/chain gears, belt/pulley gears or toothed gears.

As described above with reference to FIG. 3, the inventive connectable drive system 4.1 can also include a drive output connecting a transmission 1.8 of the motor vehicle to the driving wheels 2.2 of the additional crawler undercarriage. In this arrangement, a hydraulic transmission path 4.2 is advantageous, which may include hydraulic components, such as a pump, a converter and/or a motor.

According to an advantageous embodiment of the invention, a relatively short effective ground-contact length (600 to 1000 mm) of the running surface b and the wrap length of the revolving crawler chains/crawlers 2.4 should match the steering forces and mechanisms originally installed in the motor vehicle. In this way, the terrain-dependent steering and/or turning resistance, when changing the direction of travel, can be reduced and compensated by the available power from the motor vehicle.

According to the invention, if required for specific applications, several pairs of crawler chains/crawlers 2.4 can be installed in succession between the axles 1.3, which further reduces the ground-contact length can be.

Figure 6:
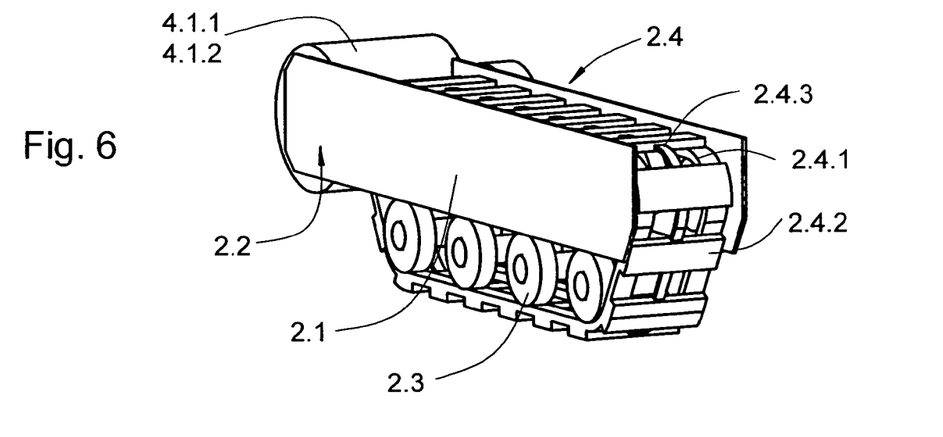
FIG. 6 is a schematic diagram of the crawler chains/crawlers of the additional crawler undercarriage in a perspective view with an attached friction roller drive.

The partial view of FIGS. 4 and 5 and the detailed view of FIG. 6 show that the crawler chains/crawlers 2.4 can include traction belts 2.4.1, chain elements 2.4.2 and transverse webs 2.4.3, which can be formed, for example, as a textile-rubber belt or link chain. The carrying wheels 2.4 can roll on the traction belts 2.4.1 as well as on the transverse webs 2.4.3.

FIG. 4 shows an exemplary assembly of crawler chains/crawlers 2.4 which can be manufactured from prefabricated standard components of other systems.

As depicted in the schematic block diagram of FIG. 9, the aforedescribed motor vehicle with the additional crawler undercarriage operating according to the invention includes a program for the third means 5, such as a controller, that control the operation of the additional crawler undercarriage 2. The program is configured to receive and process data about the condition of the terrain and data of the forces exerted on the motor vehicle, such as lateral traction/steering forces, and to transmit signals to the control elements for automatically, mechanically or manually activating and controlling components of the additional crawler undercarriage 2.

For example, the program may include program steps to deploy or not to deploy the additional crawler undercarriage 2, to adjust and distribute forces for optimizing traction transfer, such as increasing/relaxing wheel and/or load pressure on the ground, to optimize the differential speeds or to brake the crawler chains/crawlers 2.4, and to use the crawler chains/crawlers 2.4 to apply additional lateral traction/steering forces, which may depend on the steering angle of the steered wheels 1.4, for improving the steering precision. The program may further include program steps to employ an integrated traction assist for increasing road adherence, for example to improve nonskid performance under wet road conditions, ice and snow, by employing lugs, spikes, and the like, to activate tilting, lifting, and tensioning devices, and other control systems, and to optimize retraction and extension of the additional crawler undercarriage 2 for safety reasons and to introduce driving and braking forces. The program may further include steps for controlling adjustment of the ground-contact length b of the crawler chains/crawlers 2.4 to optimize the driving stability and the turning resistance, and/or for operating the crawler chains/crawlers 2.4 at speeds different from the speed of the wheels 1.5.

Figure 7:
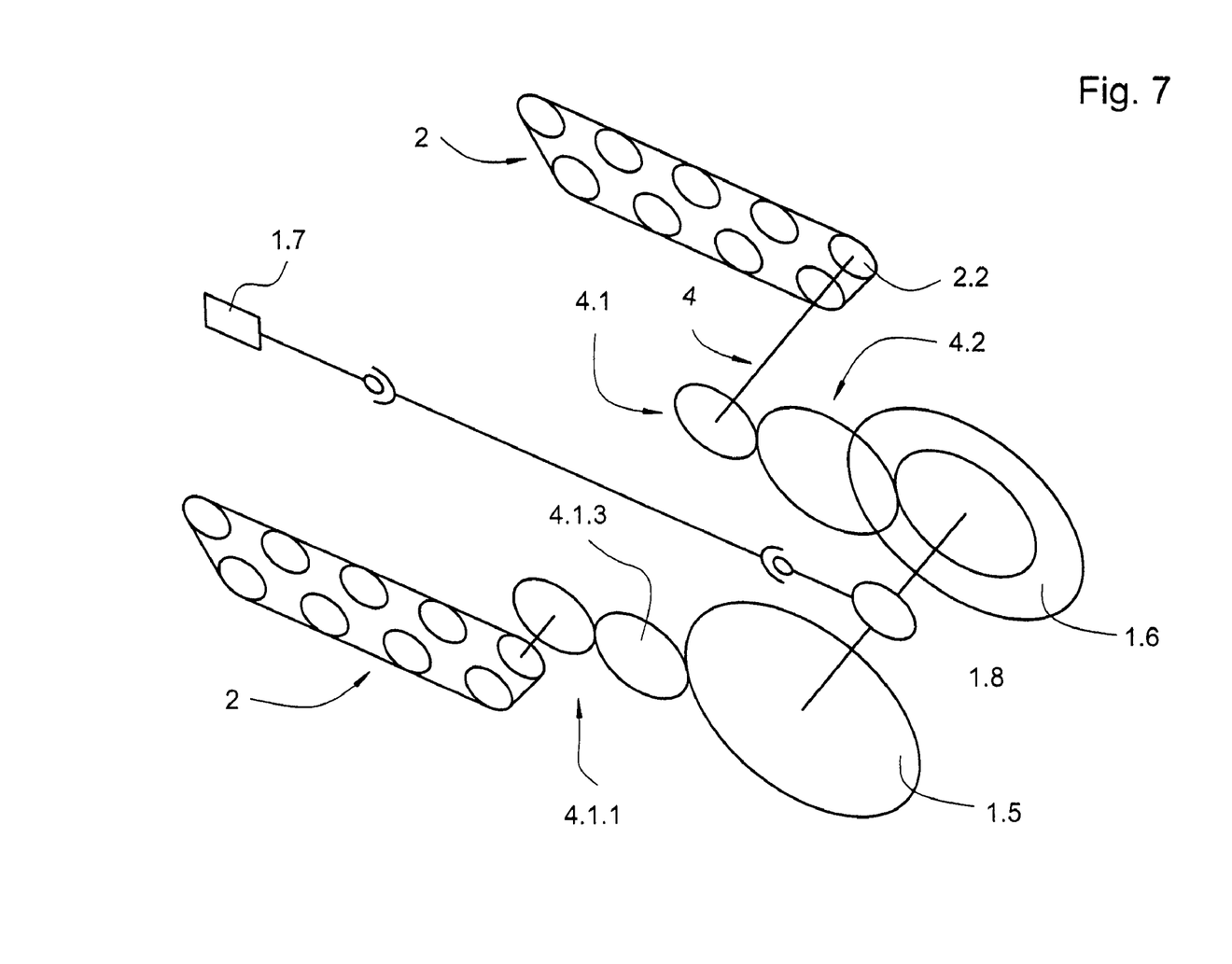
FIG. 7 shows power transfer with the friction roller drive of FIG. 2.
Figure 8:
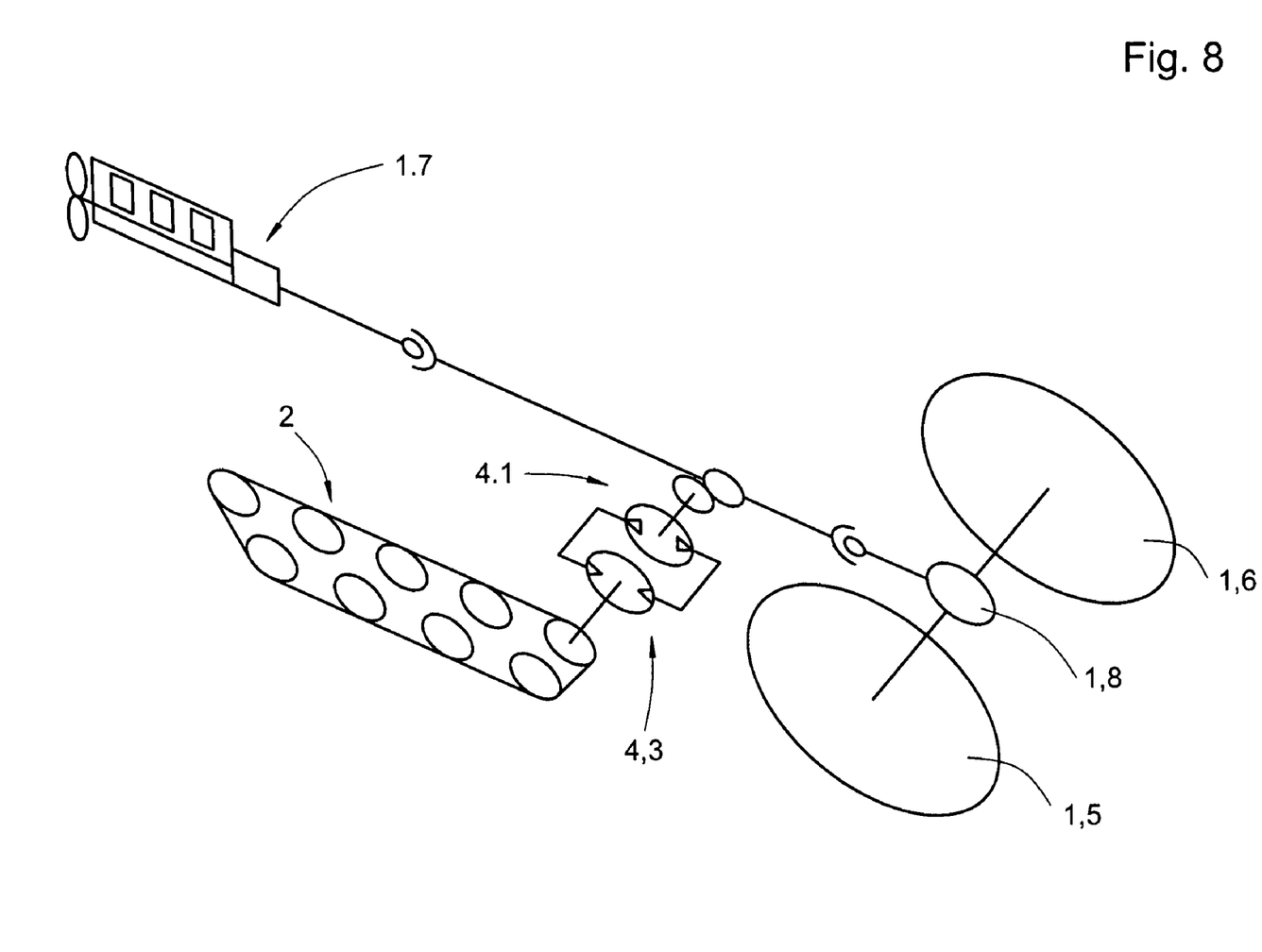
FIG. 8 shows power transfer with a hydraulic transmission path according to FIG. 3.

FIGS. 7 and 9 indicate industrial applicability of the invention by demonstrating a high power transfer efficiency of the inventive embodiments of the connectable drive for the additional crawler undercarriage 2.

What is claimed is:

1. A motor vehicle comprising:
   a chassis with at least two axles having wheels;
   an additional crawler undercarriage being arranged between the at least two axles, said additional crawler undercarriage having carrying wheels and revolving crawlers comprising traction belts made of a textile-rubber belt having transverse webs;
   a mounting assembly with an electro-hydraulic system for extendible and retractable connection between the additional crawler undercarriage and the chassis;
   a drive unit, which includes a connectable drive system with an output from a driven wheel for selectively transferring power from the motor vehicle to the additional crawler undercarriage, said additional crawler undercarriage having a traction-effective running surface with an adjustable ground-contact length, a second drive means capable of changing a position and a vertical spacing of the additional crawler undercarriage relative to the chassis; and
   a control unit for controlling the additional crawler undercarriage, said control unit being integrated in the connectable drive system and capable of controlling the ground-contact length of the traction-effective running surface;
   wherein the ground-contact length of the running surface is shorter than a distance between the at least two axles, and wherein the carrying wheels roll on the traction belts and the transverse webs;
   wherein the connectable drive system comprises a friction roller drive.

2. The motor vehicle of claim 1, wherein the friction roller drive comprises at least one friction roller arranged on a wheel for transferring drive power to the additional crawler undercarriage, and wherein a driving wheel of the additional crawler undercarriage is connected to a reversing gear.

3. The motor vehicle of claim 2, wherein a pressing force for urging the friction roller drive against a tire of the wheel is produced by forces exerted between the chassis and the additional crawler undercarriage when the wheel and the friction roller are driven against the undercarriage with the revolving crawlers.

4. The motor vehicle of claim 1, wherein the connectable drive system comprises a hydraulic transmission path.

5. The motor vehicle of claim 4, wherein the hydraulic transmission path comprises a pump, a converter, a motor, or a combination thereof.

6. the motor vehicle of claim 1, wherein several pairs of crawlers are sequentially arranged between the at least two axles.

7. A motor vehicle comprising:
   a chassis with at least two axles having wheels;
   an additional crawler undercarriage being arranged between the at least two axles, said additional crawler undercarriage having carrying wheels and revolving crawlers comprising traction belts made of a textile-rubber belt having transverse webs;
   a mounting assembly with an electro-hydraulic system for extendible and retractable connection between the additional crawler undercarriage and the chassis;
   a drive unit, which includes a connectable drive system with an output from a driven wheel, for selectively transferring power from the motor vehicle to the additional crawler undercarriage said additional crawler undercarriage having a traction-effective running surface with an adjustable ground-contact length, a second drive means capable of changing a position and a vertical spacing of the additional crawler undercarriage relative to the chassis; and
   a control unit for controlling the additional crawler undercarriage, said control unit being integrated in the connectable drive system and capable of controlling the ground-contact length of the traction-effective running surface;
   wherein the ground-contact length of the running surface is shorter than a distance between the at least two axles, and wherein the carrying wheels roll on the traction belts and the transverse webs;
   wherein the output includes a flange arranged on at least one driven wheel and an intermediate element for an efficient transfer of driving and braking energy to the crawlers.

8. The motor vehicle of claim 7, wherein the output with the flange comprises a transmission selected from the group consisting of pinion/chain, pulley/belt and toothed gear.

9. A motor vehicle comprising:
   a chassis with at least two axles having wheels;
   an additional crawler undercarriage being arranged between the at least two axles, said additional crawler undercarriage having carrying wheels and revolving crawlers comprising traction belts made of a textile-rubber belt having transverse webs;
   a mounting assembly with an electro-hydraulic system for extendible and retractable connection between the additional crawler undercarriage and the chassis;
   a drive unit, which includes a connectable drive system with an output from a driven wheel, for selectively transferring power from the motor vehicle to the additional crawler undercarriage said additional crawler undercarriage having a traction-effective running surface with an adjustable ground-contact length, a second drive means capable of changing a position and a vertical spacing of the additional crawler undercarriage relative to the chassis; and
   a control unit for controlling the additional crawler undercarriage, said control unit being integrated in the connectable drive system and capable of controlling the ground-contact length of the traction-effective running surface;

wherein the ground-contact length of the running surface is shorter than a distance between the at least two axles, and wherein the carrying wheels roll on the traction belts and the transverse webs;

wherein the control unit is integrated in the connectable drive system and configured to control speed, power, braking force, travel direction, power transfer and traction performance with respect to ground.

10. A motor vehicle comprising:
a chassis with at least two axles having wheels;
an additional crawler undercarriage being arranged between the at least two axles, said additional crawler undercarriage having carrying wheels and revolving crawlers comprising traction belts made of a textile-rubber belt having transverse webs;
a mounting assembly with an electro-hydraulic system for extendible and retractable connection between the additional crawler undercarriage and the chassis;
a drive unit, which includes a connectable drive system with an output from a driven wheel, for selectively transferring power from the motor vehicle to the additional crawler undercarriage, said additional crawler undercarriage having a traction-effective running surface with an adjustable ground-contact length, a second drive means capable of changing a position and a vertical spacing of the additional crawler undercarriage relative to the chassis;
a control unit for controlling the additional crawler undercarriage, said control unit being integrated in the connectable drive system and capable of controlling the ground-contact length of the traction-effective running surface, wherein the ground-contact length of the running surface is shorter than a distance between the at least two axles, and wherein the carrying wheels roll on the traction belts and the transverse webs; and
a program for the control unit with program steps which enable the control unit to
receive and process data about a terrain condition and data about forces exerted on the motor vehicle,
transmit signals to controlled elements for automatically, mechanically or manually deploying components that extend or retract the additional crawler undercarriage,
adjust and distribute forces to optimize traction transfer or wheel pressure,
adjust speed differences between crawlers or to brake the crawlers,
cause the crawlers to apply additional lateral traction steering forces,
improve nonskid behavior under wet road conditions, ice and snow,
control extension and ground-contact of the additional crawler undercarriage for introducing driving and braking forces,
adjust a ground-contact length of the crawlers for optimizing the driving stability and turning resistance, and
operate the crawlers at a speed different from a speed of the wheels.

11. Motor vehicle with an additional crawler undercarriage, comprising:

an assembly employed in conventional mass-produced vehicles, with a chassis (1.1), a body with optional cargo area (1.2), undercarriage, such as axles (1.3) with steered (1.4) and/or unsteered wheels (1.5), tires (1.6), wheel suspension, spring support, steering and brakes, engine-transmission unit (1.7) with means for powering the motor vehicle, said motor vehicle configured as an off road vehicle, construction vehicle, agriculture and forest management vehicle, transport vehicle, military vehicle and mobile home, an assembly with an additional crawler undercarriage (2) which can be mounted and/or retrofitted on the chassis (1.1) between the axles (1.3) and used as desired in any terrain, said undercarriage assembly comprising an undercarriage (2.1) with drive wheels (2.2) and carrying wheels (2.3) and revolving crawler chains/crawlers (2.4) and associated elements, first means (3) for providing an optionally extendable and retractable connection of the undercarriage (2.1) with the chassis (1.1), and second means (4) for selectively transmitting or coupling a second drive from the motor vehicle to the additional crawler undercarriage (2), as well as third means (5) for controlling the operation of the additional crawler undercarriage (2), such as steering, braking, acceleration and speed of the crawler chains/crawlers (2.4), wherein a) the additional crawler undercarriage (2) is adjustably arranged with its traction-effective running surface (b) by the first means (3), which include an electro-hydraulic system (3.1), at a vertical spacing (a) and position relative to the chassis (1.1), and the second means (4) for selectively transmitting the second drive include a connectable driving system (4.1) for the additional crawler undercarriage (2), said connectable driving system (4.1) deriving power from at least one driven wheel (1.5) of the motor vehicle for driving the additional crawler undercarriage (2), b) the additional crawler undercarriage (2) can be powered by the connectable driving system (4.1) with effective situation-dependent traction within an arbitrary range of the vertical spacing (a) and in an arbitrary position of the additional crawler undercarriage relative to the chassis (1.1), depending on objective conditions of the road surface or terrain, c) the additional crawler undercarriage (2) with the first means (3) for optionally extending and retracting or connecting the undercarriage (2.1) relative to the chassis (1.1) is constructed so that a traction-effective running surface (b) of the crawler chains/crawlers (2.4) with an optionally adjustable ground-contact length can be used with its corresponding spacing (a), and can be operated by third means (5) integrated in the connectable driving system (4.1) to adjust speed, power, braking forces, driving directions, power transfer, and/or specific traction criteria with respect to the road surface or terrain, and d) the revolving crawler chains/crawlers (2.4) have a shorter ground-contact length (b) relative to a spacing between the axles (1.3) and include traction belts (2.4.1) formed of a textile-rubber belt with chain elements (2.4.2) and transverse webs (2.4.3), wherein the carrying wheels (2.4) roll on both the traction belts (2.4).and the transverse webs (2.4.3).

* * * * *